United States Patent
Evans

[11] Patent Number: 5,921,354
[45] Date of Patent: Jul. 13, 1999

[54] SELF-ENERGIZING ANTI-CREEP PARKING AND EMERGENCY BRAKE MECHANISM FOR DISC BRAKE ASSEMBLY

[75] Inventor: Anthony C. Evans, Northville, Mich.

[73] Assignee: Kelsey-Hayes Company, Livonia, Mich.

[21] Appl. No.: 08/851,914

[22] Filed: May 6, 1997

Related U.S. Application Data

[60] Provisional application No. 60/016,535, May 7, 1996.
[51] Int. Cl.⁶ ..................................................... F16D 65/00
[52] U.S. Cl. ......................................... 188/73.2; 188/72.2
[58] Field of Search ................................ 188/72.2, 72.6, 188/72.9, 106 F, 73.2, 196 V

[56] References Cited

U.S. PATENT DOCUMENTS

| | | | |
|---|---|---|---|
| 654,808 | 7/1900 | Sauvage | 188/72.2 |
| 2,207,261 | 7/1940 | Lane . | |
| 2,212,322 | 8/1940 | Lane . | |
| 3,422,932 | 1/1969 | Wilson et al. | 188/72.2 |
| 3,613,837 | 10/1971 | Tsubouchi | 188/72.9 |
| 3,626,485 | 12/1971 | Holloway . | |
| 3,645,352 | 2/1972 | Stark et al. . | |
| 3,771,630 | 11/1973 | Koivunen . | |
| 3,809,190 | 5/1974 | Evans | 188/72.2 |
| 3,899,051 | 8/1975 | Grosseau | 188/73.5 |
| 4,077,498 | 3/1978 | Brown et al. | 188/72.2 |
| 4,310,064 | 1/1982 | Kazarian, Jr. . | |
| 4,375,250 | 3/1983 | Burgdorf | 188/72.2 |
| 4,497,395 | 2/1985 | Nogami et al. . | |
| 4,540,066 | 9/1985 | Evans | 188/72.6 |
| 4,800,993 | 1/1989 | Weber | 188/72.6 |
| 4,804,072 | 2/1989 | Michoux et al. . | |
| 4,993,519 | 2/1991 | Thioux | 188/71.3 |
| 5,038,895 | 8/1991 | Evans | 188/72.7 |
| 5,168,963 | 12/1992 | Poncini | 188/72.5 |
| 5,531,308 | 7/1996 | Gochenour et al. | 188/196 V X |

FOREIGN PATENT DOCUMENTS

| | | | |
|---|---|---|---|
| 272236 | 1/1967 | Australia | 188/72.2 |
| 1000557 | 8/1965 | United Kingdom | 188/72.6 |
| 1034172 | 6/1966 | United Kingdom | 188/72.6 |

Primary Examiner—Robert J. Oberleitner
Assistant Examiner—Pamela J. Lipka
Attorney, Agent, or Firm—MacMillan, Sobanski & Todd, LLC

[57] ABSTRACT

This invention relates to an improved self-energizing anti-creep parking and emergency brake mechanism for use with a disc brake assembly. The disc brake assembly includes a first pair of brake shoes disposed on opposite sides of a brake rotor. A service brake mechanism is carried by a caliper and is adapted to be actuated to selectively move the first pair of brake shoes from a non-braking position, wherein the first pair of brake shoes are disengaged from the brake rotor, to a service braking position, wherein the first pair of brake shoes frictionally engage the brake rotor. The disc brake assembly further includes a second pair of brake shoes disposed on opposite sides of the brake rotor. A parking and emergency brake mechanism is carried by the anchor plate and is adapted to be actuated to selectively move the second pair of brake shoes from a non-braking position, wherein the second pair of brake shoes are disengaged from the brake rotor, to a parking and emergency braking position, wherein the second pair of brake shoes frictionally engage the brake rotor. The parking and emergency brake mechanism exerts a predetermined force against the second pair of brake shoes urging them into frictional engagement with the brake rotor when the parking and emergency brake mechanism is applied and there is no relative rotation between the second pair of brake shoes and the brake rotor. The parking and emergency brake mechanism further includes a cam mechanism which exerts an additional force against the second pair of brake shoes urging them into frictional engagement with the brake rotor when the parking and emergency brake is applied and there is relative rotation between the brake rotor and the second pair of brake shoes.

14 Claims, 8 Drawing Sheets

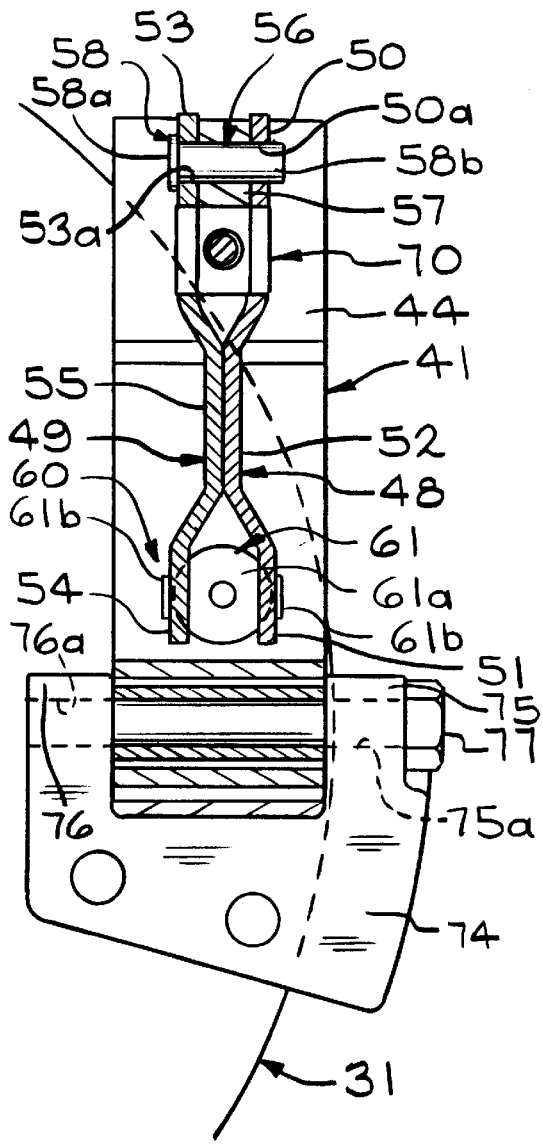
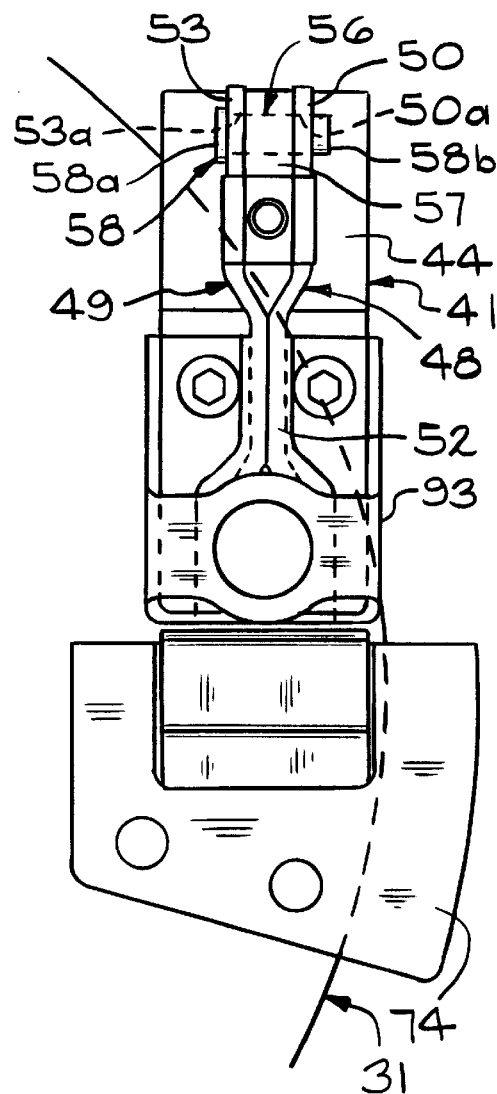
FIG. 8
FIG. 9

SELF-ENERGIZING ANTI-CREEP PARKING AND EMERGENCY BRAKE MECHANISM FOR DISC BRAKE ASSEMBLY

CROSS-REFERENCE TO RELATED APPLICATIONS

This application claims the benefit of U.S. Provisional Application Ser. No. 60/016,535, filed May 7, 1996.

BACKGROUND OF THE INVENTION

This invention relates in general to vehicle disc brake assemblies and in particular to an improved structure for a parking and emergency brake mechanism adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a brake rotor which is secured to the wheel of the vehicle for rotation therewith. The brake rotor includes a pair of opposed friction surfaces which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction surfaces of the brake rotor, and a braking position, wherein they are moved into frictional engagement with the opposed friction surfaces of the brake rotor. When the operator of the vehicle depresses the brake pedal, the piston urges the brake shoes from the non-braking position to the braking position so as to frictionally engage the friction surfaces of the brake rotor and thereby slow or stop the rotation of the associated wheel of the vehicle.

When a disc brake assembly is used for the rear wheels of the vehicle, a mechanically actuated parking and emergency brake mechanism is also usually provided for selectively actuating the disc brake assembly. The parking and emergency brake mechanism is applied by a cable through foot or hand application by the vehicle operator. The parking and emergency brake mechanism is typically either a "drum-in-hat" type of parking and emergency brake, such as shown in U.S. Pat. No. 5,180,037 to Evans, or an "integral" type of parking and emergency brake, such as shown in U.S. Pat. No. 5,038,895 to Evans.

SUMMARY OF THE INVENTION

This invention relates to an improved self-energizing anti-creep parking and emergency brake mechanism for use with a disc brake assembly wherein the parking and emergency brake mechanism is separate from the normal service brake mechanism of the associated disc brake assembly. The disc brake assembly includes an anchor plate adapted to be connected to a non-rotatable component of a vehicle, a caliper connected to the anchor plate, and a brake rotor adapted to be connected to a rotatable component of the vehicle for rotation therewith. A first pair of brake shoes are disposed on opposite sides of the brake rotor. A service brake mechanism is carried by the caliper and is adapted to be actuated to selectively move the first pair of brake shoes from a non-braking position, wherein the first pair of brake shoes are disengaged from the brake rotor, to a service braking position, wherein the first pair of brake shoes frictionally engage the brake rotor. The disc brake assembly further includes a second pair of brake shoes disposed on opposite sides of the brake rotor. A parking and emergency brake mechanism is carried by the anchor plate and is adapted to be actuated to selectively move the second pair of brake shoes from a non-braking position, wherein the second pair of brake shoes are disengaged from the brake rotor, to a parking and emergency braking position, wherein the second pair of brake shoes frictionally engage the brake rotor. The parking and emergency brake mechanism exerts a predetermined force against the second pair of brake shoes urging them into frictional engagement with the brake rotor when the parking and emergency brake mechanism is applied and there is no relative rotation between the second pair of brake shoes and the brake rotor. The parking and emergency brake mechanism further includes a cam mechanism which exerts an additional force against the second pair of brake shoes urging them into frictional engagement with the brake rotor when the parking and emergency brake is applied and there is relative rotation between the brake rotor and the second pair of brake shoes.

Various objects and advantages of this invention will become apparent to those skilled in the art from the following detailed description of the preferred embodiment, when read in light of the accompanying drawings.

BRIEF DESCRIPTION OF THE DRAWINGS

FIG. 8 is a sectional elevational view taken along line 8—8 of FIG. 7.

FIG. 9 is. a sectional elevational view taken along line 9—9 of FIG. 7.

DETAILED DESCRIPTION OF THE PREFERRED EMBODIMENT

Figure 1:
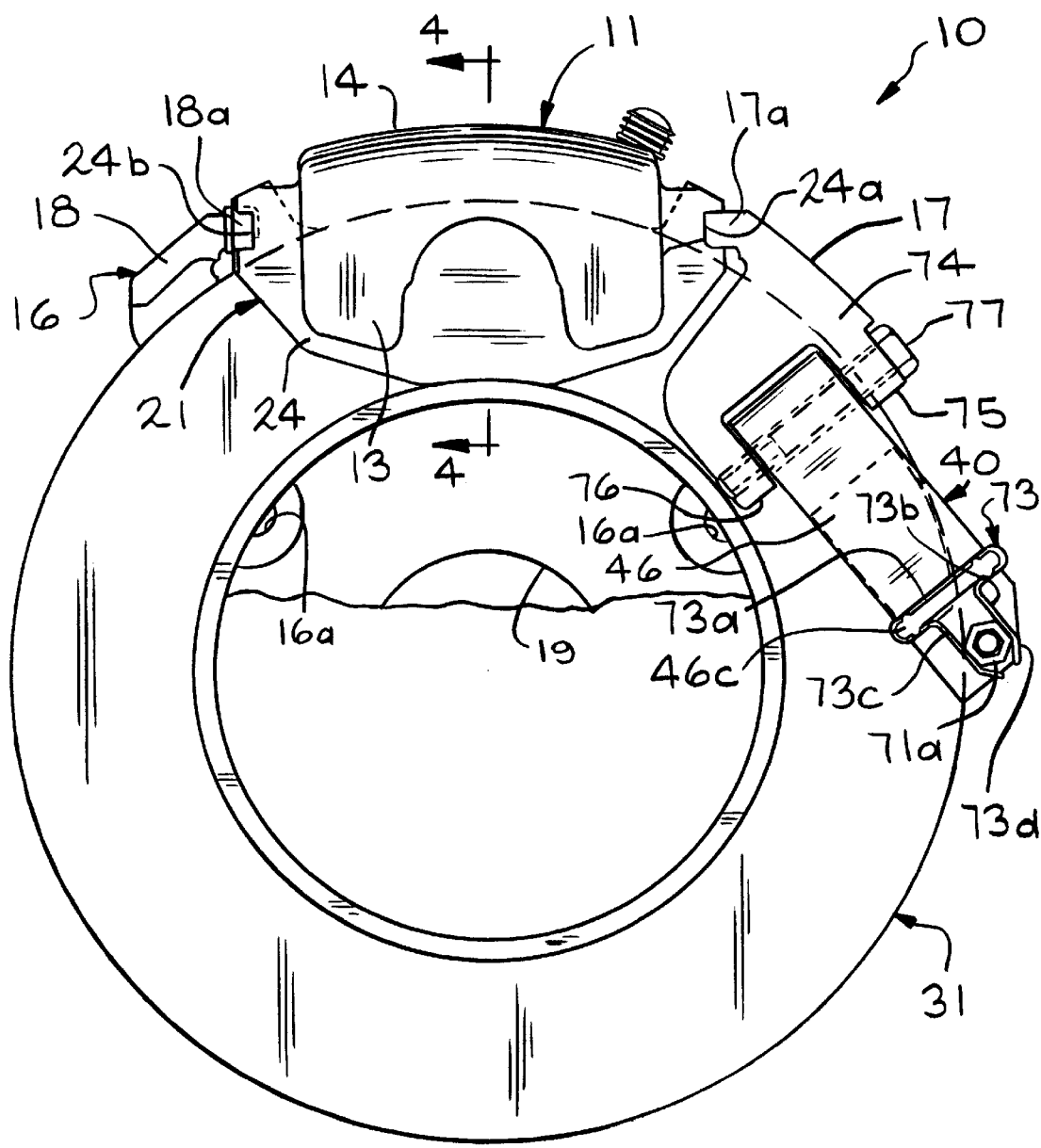
FIG. 1 is an outboard elevational view of a portion of a disc brake assembly including an improved self-energizing anti-creep parking and emergency brake mechanism in accordance with this invention.
Figure 2:
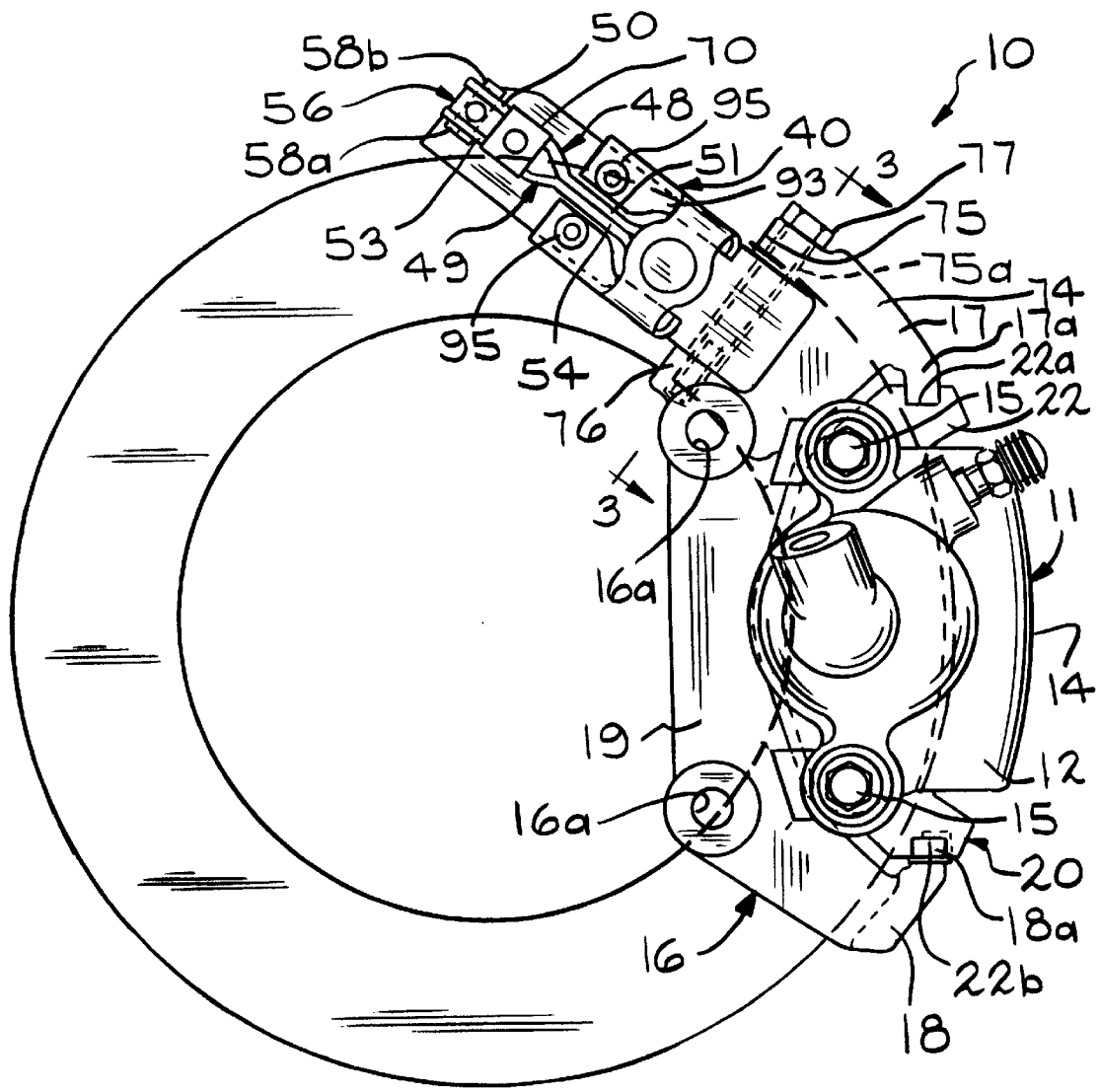
FIG. 2 is an inboard elevational view of a portion of the disc brake assembly illustrated in FIG. 1.
Figure 3:
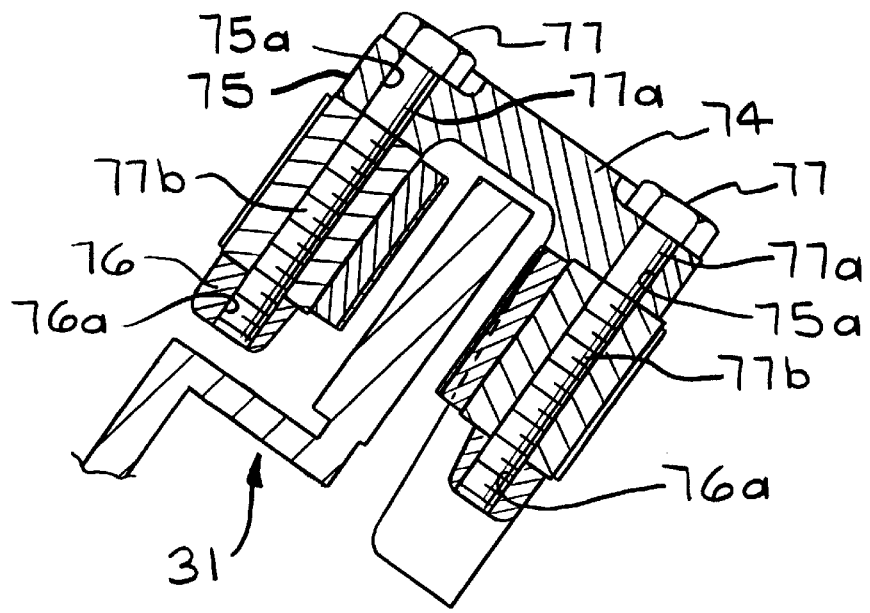
FIG. 3 is a sectional elevational view taken along line 3—3 of FIG. 2.

Referring now to the drawings, there is illustrated in FIGS. 1 and 2 a portion of a vehicle disc brake assembly, indicated generally at 10, including an improved self-energizing anti-creep parking and emergency brake mechanism 40 in accordance with this invention. The general structure and operation of the disc brake assembly 10 is conventional in the art. Thus, only those portions of the disc brake assembly 10 which are necessary for a full understanding of this invention will be explained and illustrated. Although the parking and emergency brake mechanism 40 of this invention will be described and illustrated in connection with the particular vehicle disc brake assembly structure disclosed herein, it will be appreciated that this invention may be used in connection with other disc brake assembly structures.

Figure 4:
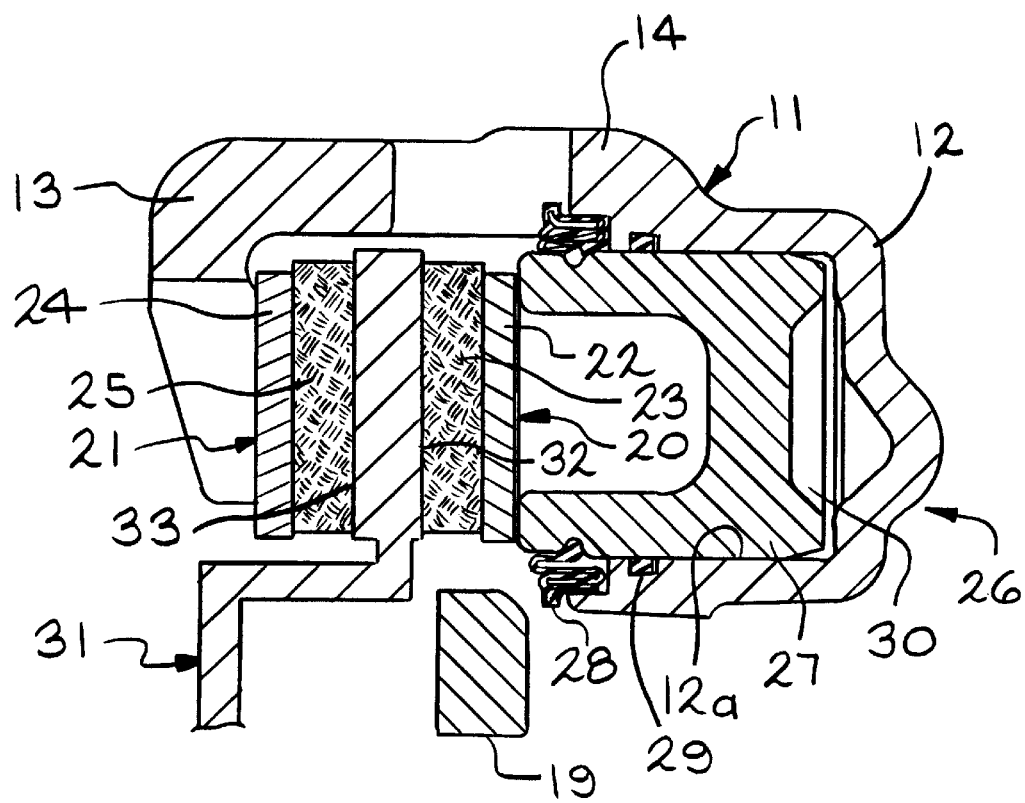
FIG. 4 is a sectional elevational view taken along line 4—4 of FIG. 1.

The disc brake assembly 10 includes a generally C-shaped caliper, indicated generally at 11. As shown in FIG. 4, the caliper 11 includes an inboard leg portion 12 and an outboard leg portion 13 which are interconnected by an intermediate bridge portion 14. The caliper 11 is slidably supported on a pair of pins 15 secured to an anchor plate 16. The pins 15 extend through respective non-threaded apertures (not shown) formed through the inboard leg 12 of the caliper 11. The pins 15 have threaded ends (not shown) which are received in respective threaded apertures (not shown) formed through the anchor plate 16. The pins 15 permit the caliper 11 to slide in both the outboard direction (toward the left when viewing FIG. 4) and the inboard direction (toward the right when viewing FIG. 4). Such sliding movement of the caliper 11 occurs when the disc brake assembly 10 is actuated, as will be explained below. A pair of bolts (not shown) extend through respective non-threaded apertures 16a formed through the anchor plate 16 to secure the anchor plate 16 to a stationary component of the vehicle, such as the steering knuckle (not shown) or the axle flange (not shown).

The illustrated anchor plate 16 includes a pair of outwardly extending arms 17 and 18 which are interconnected by an inner tie bar 19. The arms 17 and 18 have respective upstanding guide rails 17a and 18a formed thereon. The guide rails 17a and 18a extend transverse to the arms 17 and 18 and parallel to one another. The guide rails 17a and 18a are provided to slidably support an inboard service brake shoe, indicated generally at 20, and an outboard service brake shoe, indicated generally at 21, respectively.

The inboard brake shoe 20 includes a backing plate 22 and a friction pad 23. The opposed ends of the inboard backing plate 22 have notches 22a and 22b formed therein for supporting the inboard brake shoe 20 on the guide rails 17a and 18a of the anchor plate 16. The outboard brake shoe 21 includes a backing plate 24 and a friction pad 25. The opposed ends of the outboard backing plate 24 have notches 24a and 24b formed therein for supporting the outboard brake shoe 21 on the guide rails 17a and 18a of the anchor plate 16. Alternatively, as is known in the art, the inboard brake shoe 20 can be supported on a brake piston, while the outboard brake shoe 21 can be supported on the outboard leg portion 13 of the caliper 11.

An actuation means, indicated generally at 26 in FIG. 4, is provided for effecting the operation of the disc brake assembly 10. The illustrated actuation means 26 includes a piston 27 which is slidably disposed in a counterbore or recess 12a formed in the outboard surface of the inboard leg 12 of the caliper 11. The actuation means 26, shown in this embodiment as being a hydraulic actuation means, is operable to move the piston 27 in the outboard direction within the recess 12a (toward the left when viewing FIG. 4) when operated. However, other types of actuation means 26, such as electrical and mechanical types, can be used.

The disc brake assembly 10 also includes a dust boot seal 28 and an annular fluid seal 29. The dust boot seal 28 is formed from a flexible material and has a first end which engages an outboard end of the recess 12a. A second end of the dust boot seal 28 engages an annular groove formed in an outer side wall of the piston 27. A plurality of flexible convolutions are provided in the dust boot seal 28 between the first and second ends thereof. The dust boot seal 28 is provided to prevent water, dirt, and other contaminants from entering into the recess 12a. The fluid seal 29 is disposed in an annular groove formed in a side wall of the recess 12a and engages the outer side wall of the piston 27. The fluid seal 29 is provided to define a sealed hydraulic actuator chamber 30, within which the piston 27 is disposed for sliding movement. Also, the fluid seal 29 is designed to function as a "roll back" seal to retract the piston 27 within the recess 12a (toward the right when viewing FIG. 4) when the brake pedal (not shown) is released.

The disc brake assembly 10 further includes a rotor, indicated generally at 31, which is connected to a wheel (not shown) of the vehicle for rotation therewith. The illustrated rotor 31 is a solid rotor and includes a pair of opposed friction surfaces 32 and 33. The rotor 31 extends radially outwardly between the inboard friction pad 23 and the outboard friction pad 25.

When it is desired to actuate the disc brake assembly 10 to slow or stop the rotation of the rotor 31 and the vehicle wheel associated therewith, the driver of the vehicle depresses the brake pedal. In a manner which is well known in the art, the depression of the brake pedal causes pressurized hydraulic fluid to be introduced into the chamber 30. Such pressurized hydraulic fluid urges the piston 27 in the outboard direction (toward the left when viewing FIG. 4) into engagement with the backing plate 22 of the inboard brake shoe 20. As a result, the friction pad 23 of the inboard brake shoe 20 is moved into frictional engagement with the inboard friction surface 32 of the rotor 31. At the same time, the caliper 11 slides on the pins 15 in the inboard direction (toward the right when viewing FIG. 5) such that the outboard leg 13 thereof moves the friction pad 25 of the outboard brake shoe 21 into frictional engagement with the outboard friction surface 33 of the rotor 31. As a result, the opposed friction surfaces 32 and 33 of the rotor 31 are frictionally engaged by the friction pads 23 and 25. The structure and operation of the disc brake assembly 10 thus far described is conventional in the art.

Figure 5:
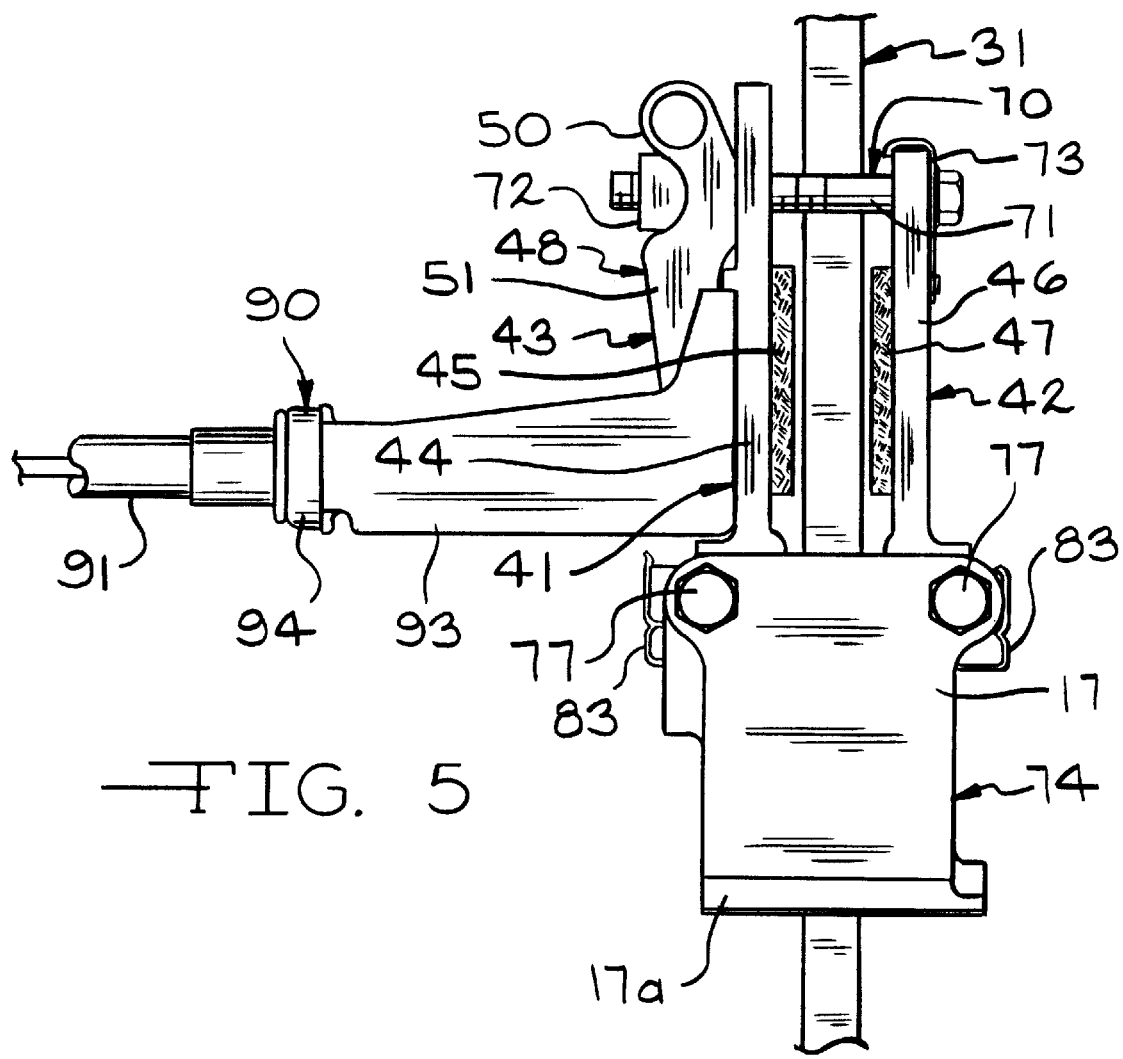
FIG. 5 is a view of a portion of the self-energizing anti-creep parking and emergency brake mechanism.

As shown in FIG. 5, the parking and emergency brake mechanism 40 of this invention includes an inboard parking and emergency brake shoe, indicated generally at 41, an outboard parking and emergency brake shoe, indicated generally at 42, and an actuating lever mechanism, indicated generally at 43. The inboard brake shoe 41 includes a support plate 44 and a friction pad 45. The outboard brake shoe 42 includes a support plate 46 and a friction pad 47. The rotor 31 extends radially outwardly between the inboard friction pad 45 and the outboard friction pad 47 of the brake shoes 41 and 42, respectively.

Figure 6:
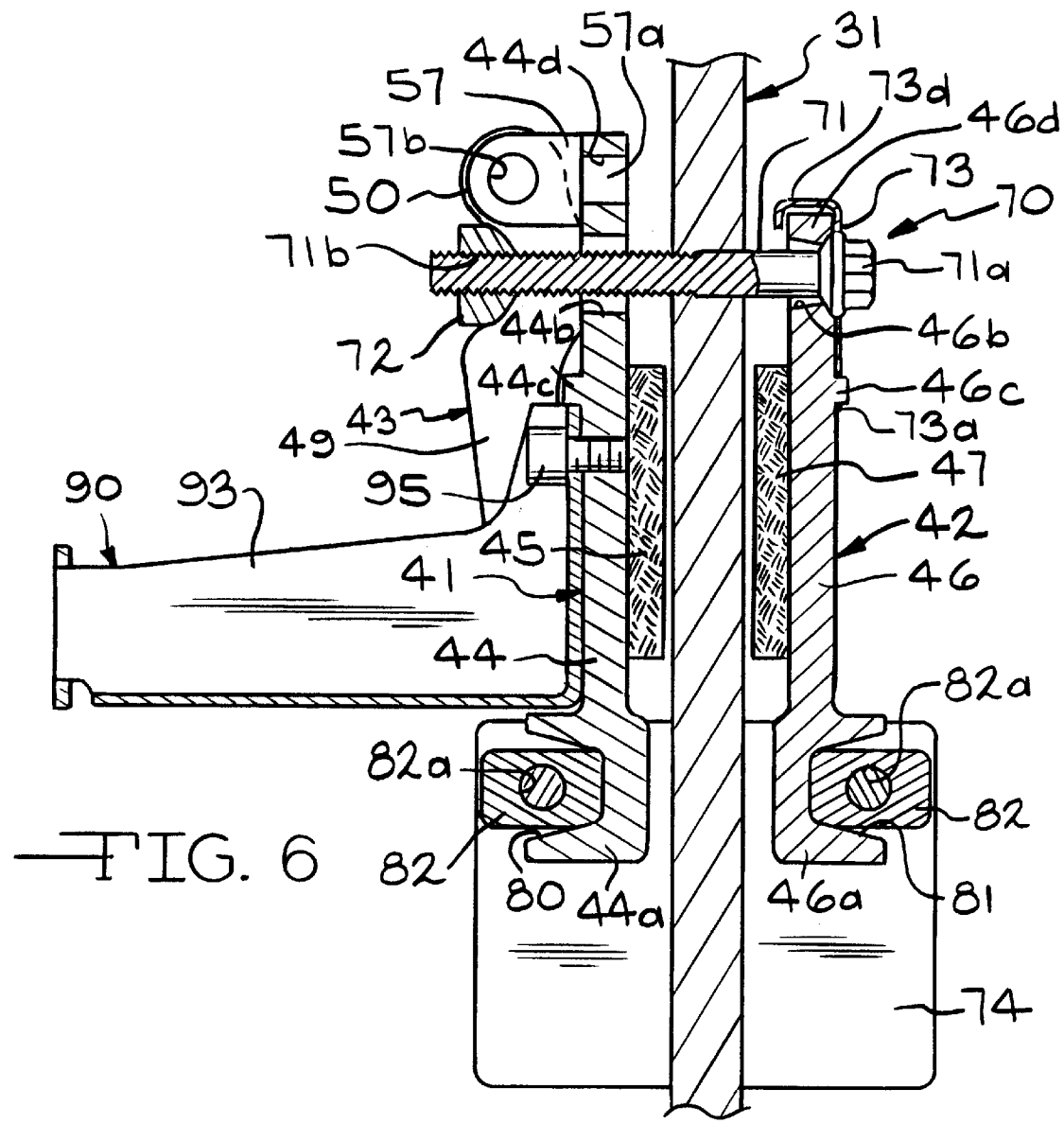
FIG. 6 is another view of a portion of the self-energizing anti-creep parking and emergency brake mechanism.
Figure 7:
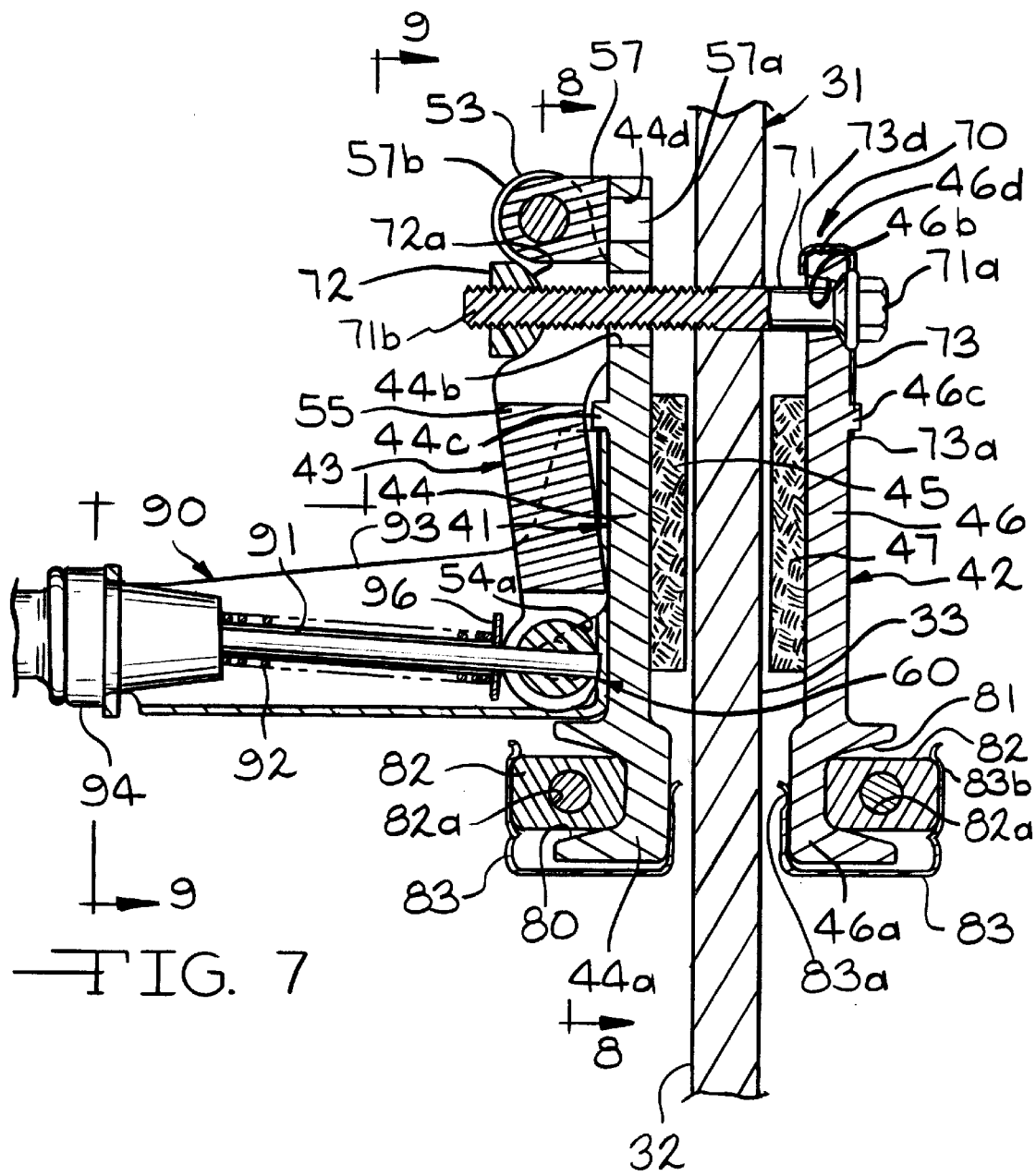
FIG. 7 is yet another view of a portion of the self-energizing anti-creep parking and emergency brake mechanism.
Figure 10:
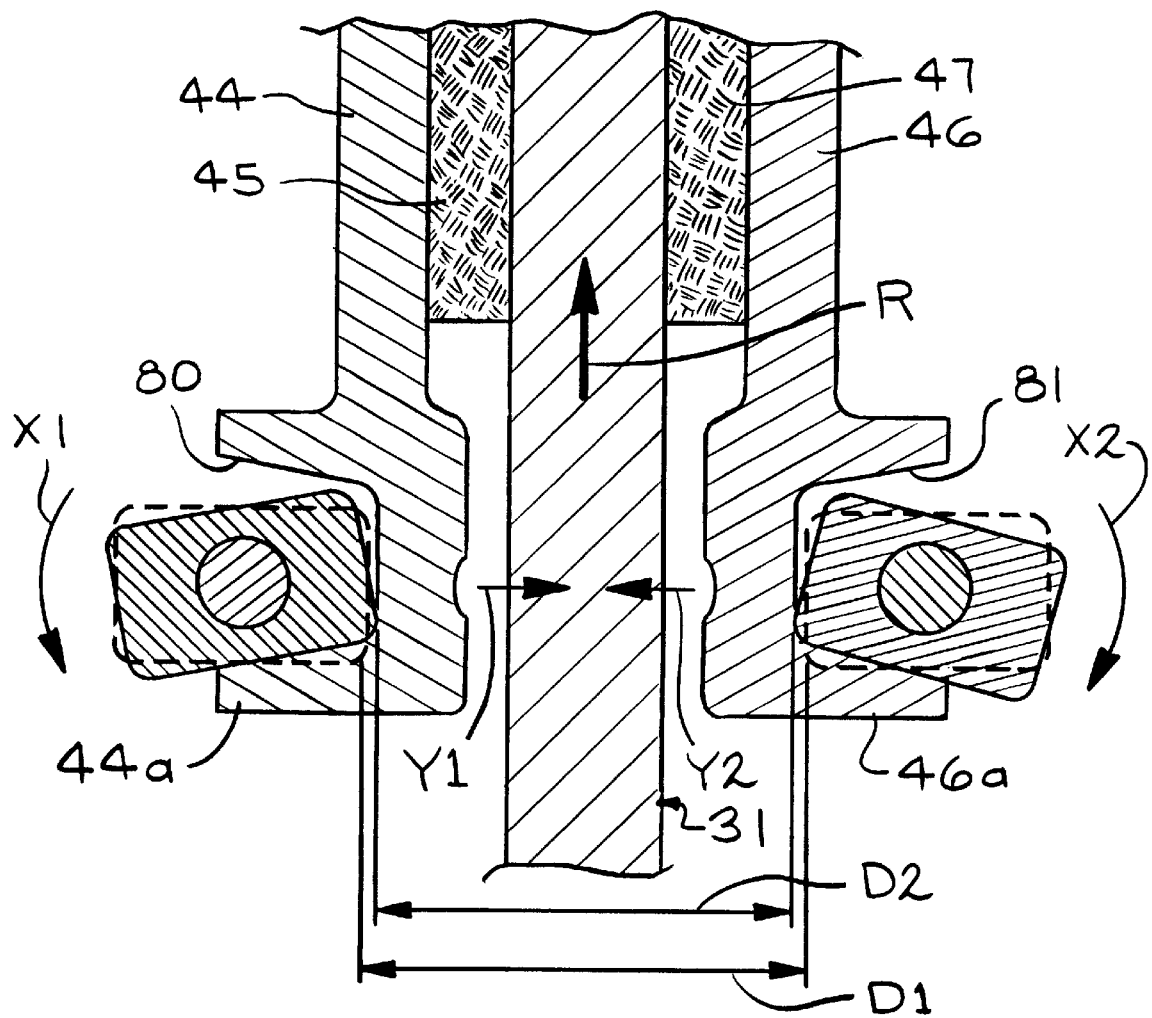
FIG. 10 is an enlarged view of a portion of the self-energizing anti-creep parking and emergency brake mechanism shown in FIG. 7 illustrating the anti-creep action of the brake mechanism.

The support plate 44 of the inboard brake shoe 41 includes a generally C-shaped end 44a having a recess 80 formed therein, shown in FIGS. 6 and 7. Similarly, the support plate 46 of the outboard brake shoe 42 includes a generally C-shaped end 46a having a recess 81 formed therein. As will be discussed below, a block 82 is disposed in the recesses 80 and 81 of each end 44a and 46a of the support plates 44 and 46, respectively, for supporting the parking and emergency brake mechanism relative to the disc brake assembly 10. Each of the blocks 82 is provided with a non-threaded opening 82a formed therethrough for supporting the parking and emergency brake mechanism 40 relative to the disc brake assembly 10. The support plate 44 further includes a first non-threaded opening 44b, an outwardly extending projection 44c, and a second non-threaded opening 44d. The support plate 46 includes a first non-threaded opening 46b and an outwardly extending projection 46c.

The actuating lever mechanism 43 of the parking and emergency brake mechanism 40 includes a pair of links 48 and 49, best shown in FIGS. 8 and 9. The upper link 48 includes a first end 50, a second end 51, and a middle portion 52. The first end 50 of the upper link 48 includes a non-threaded opening 50a formed therethrough, and the opposite second end 51 of the upper link 48 includes a generally annular shaped notched opening (not shown) formed therein. The lower link 49 includes a first end 53, a second end 54, and a middle 25 portion 55. The first end 53 of the lower link 49 includes a non-threaded opening 53a formed therethrough, and the opposite second end 54 of the lower link 49 includes a generally annular shaped notched opening 54a formed therein. Alternatively, the second ends 51 and 54 of the links 48 and 49, respectively, can include openings (not shown) formed therein instead of the notched openings.

The first ends 50 and 53 of the respective links 48 and 49 are spaced apart from one another and coupled together by a first pivot block assembly, indicated generally at 56, which is secured to the inboard backing plate 44 of the brake shoe 41. In the illustrated embodiment, the first pivot block assembly 56 includes a block 57 and a pivot pin 58. The block 57 is provided with a projection 57a, shown in FIGS. 6 and 7, which extends through and is frictionally retained in the non-threaded opening 44d provided in the backing plate 44. The block 57 further includes a non-threaded opening 57b formed therethrough.

The pivot pin 58 of the first pivot block assembly 56 is provided to secure the first ends 50 and 53 of the links 48 and 49, respectively, to the block 57 and therefore, to the inboard brake shoe 41 of the parking and emergency brake mechanism 40. To accomplish this, the pivot pin 58 includes an enlarged head 58a and a reduced diameter body 58b. The body 58b of the pivot pin 58 extends through the opening 53a provided in the first end 53 of the lower link 49, through the opening 57b provided in the block 57, and through the opening 50a provided in the first end 50 of the upper link 48. The outer end of the body 58b of the pin 58 is staked over or otherwise fixed to thereby secure the upper link 48 and the lower link 49 to the block 57 for pivotal movement relative thereto.

The second ends 51 and 54 of the respective links 48 and 49 are spaced apart from another and coupled together by a second pivot block assembly 60. In the illustrated embodiment, the second pivot block assembly includes a block 61 having an intermediate main body 61 a and opposed reduced diameter ends 61 b. The main body 61a of the block 61 is disposed between the second ends 51 and 54 of the respective links 48 and 49, and held in place when the links 48 and 49 are spot welded together in the middle portions 52 and 55 thereof. Alternatively, the links 48 and 49 can be joined by other means and/or the second ends 51 and 54 thereof can be coupled to the block 61 by other methods. The block 61 further includes a generally U-shaped slot (not shown) formed therein to receive a cable end. Preferably, the slot includes a counterbore (not shown) to positively locate a nipple (not shown) attached to the cable end.

The parking and emergency brake mechanism 40 further includes a manual adjustment mechanism, indicated generally at 70. The adjustment mechanism includes 70 includes a bolt 71, a threaded nut 72, and a spring 73. The bolt 71 includes an enlarged head 71a and a threaded end 71b. The bolt 71 extends through the apertures 46b and 44b of the support plates 46 and 44, respectively, to allow the nut 72 to be installed on the threaded end 71b thereof. As shown in FIG. 7, the nut 72 has an inner side 72a which engages and generally corresponds to the shape of an adjacent portion of the first ends 50 and 53 of the links 48 and 49, respectively. In the illustrated embodiment, the inner side 72a of the nut 72 is generally semi-circular in shape and the adjacent portion of the respective first ends 50 and 53 of the links 48 and 49 are generally semi-circular in shape.

As best shown in FIG. 1, the spring 73 of the adjustment mechanism 70 includes a generally closed first end 73a, a pair of spaced apart arms 73b and 73c, and an open opposite second end 73d. The closed end 73a of the spring 73 is attached to the projection 46c of the support plate 46, and the spaced apart arms 73b and 73c of the spring 73 engage opposite sides of the hex head 71a of the bolt 71. The open end 73d of the spring 73 includes a pair of generally U-shaped end portions which are looped over an end surface 46d of the support plate 46, shown in FIGS. 6 and 7.

In the illustrated embodiment, the arm 17 of the anchor plate 16 includes an extended portion 74 which defines a support or mounting member for securing the parking and emergency brake mechanism 40 to anchor plate 16 of the disc brake assembly 10. The mounting member 74 is split or divided into an upper mounting member portion 75 and a lower mounting member portion 76. A pair of threaded apertures 75a are formed through upper mounting member portion 75, and a pair of lower non-threaded apertures 76a are formed through the lower mounting member portion 76. Alternatively, the mounting member 74 can be other than illustrated if desired. For example, the mounting member 74 can be formed as an entirely separate component and secured to the anchor plate 16 by suitable means, or the mounting member 74 can be integrally formed with a component of a fixed type of caliper (not shown) or a separate component secured thereto. The important feature is that the parking and emergency brake mechanism 40 be secured to a fixed non-movable component of the associated disc brake assembly and/or vehicle.

A pair of bolts 77 are provided for securing the parking and emergency brake mechanism 40 to the anchor plate 16 of the disc brake assembly 10. The bolts 77 include threaded upper ends 77a, and non-threaded bodies 77b. The bolts 77 extend through and are threadably received in the upper apertures 75a of the upper mounting member portion 75, and the bodies 77b extend through the apertures 82a of the associated blocks 82 and into the lower non-threaded apertures 76a of the lower mounting member portion 76a. As will be discussed below, a pair of generally U-shaped return and anti-rattle springs 83 are carried by the parking and emergency brake mechanism 40 for retaining and/or moving the blocks 82 to the normal unactuated position shown in FIGS. 5, 6, and 7. To accomplish this, each of the springs 83 includes a first end 83a which is disposed in a respective notch formed in the support plates 44 and 46, and a second end 83b which is disposed over an outer side surface of the blocks 82.

The parking and emergency brake mechanism 40 further includes a cable assembly, indicated generally at 90. The cable assembly 90 includes a cable 91, a compression spring 92, a housing 93, and a elastomeric seal 94. The cable 91 includes a first end operatively connected to the second pivot block assembly 60, and an opposite second end (not shown) which is operatively connected to a foot operated brake pedal (not shown), a hand operated brake lever (not shown), or similar manually operable parking and emergency brake mechanism for selectively actuating the parking and emergency brake mechanism 40 via the links 48 and 49. The housing 93 is secured to the support plate 44 by a pair of fasteners 95. Also, as shown in FIG. 6, a flat washer 96 is provided between an end of the spring 92 and the links 48 and 49.

To actuate the parking and emergency brake mechanism 40, the cable 91 is pulled (toward the left when viewing FIGS. 5 and 7), causing the links 48 and 49 to pivot about the first pivot block assembly 56. As a result, the first ends 50 and 53 of the links 48 and 49, respectively, move the inboard brake shoe 41 inwardly into frictional engagement with the inboard friction plate surface 32 of the rotor 31. At the same time, the head 71a of the bolt 71 moves the outboard brake shoe 42 inwardly into frictional engagement with the outboard friction plate surface 33 of the rotor 31, thereby preventing rotation of the rotor 31, and therefore, movement of the vehicle.

The specific operation of the self-energizing anti-creep feature of the parking and emergency brake mechanism 40 of this invention will be discussed. As discussed above, when the parking and emergency brake is applied, the brake shoes 41 and 42 of the parking and emergency brake mechanism 40 frictionally engage the rotor 31. In order to ensure that the brake shoes 41 and 42 frictionally engage the rotor 31 and prevent creep of the vehicle, the blocks 82 are effective to produce a "cam" affect action of the brake shoes 41 and 42 which provides the self-energizing anti-creep feature of parking and emergency brake mechanism 40 of this invention.

This occurs when the parking and emergency brake is applied and the rotor 31 starts to move in the direction of the arrow R. As a result of this rotation of the rotor 31, the blocks 82 will rotate in the direction of the arrows X1 and X2 causing the ends 44a and 46a of the respective support plates 44 and 46 to move further inwardly in the direction of the arrows Y1 and Y2 toward the rotor 31. Such movement is shown as being operative to decrease the axial distance separating the inwardly facing edges of the blocks 82 from an initial axial distance D1 to an actuated axial distance D2 which is less than the distance D1. As a result, when the parking and emergency brake is applied and the rotor 31 begins to rotate relative thereto, the blocks 82 move the associated brake shoes 41 and 42 further inwardly to ensure that the brake shoes 41 and 42 frictionally engage the rotor 31 and prevent rotation thereof.

For example, during normal vehicle braking, the rotor 31 can become heated and expand, increasing the axial thickness between the inboard friction surface 32 and the outboard friction surface 33 thereof. Thus, if the parking and emergency brake is applied while the rotor 31 is expanded, the parking and emergency brake mechanism 40 of this invention is effective to ensure that the brake shoes 41 and 42 will continue to frictionally engage the rotor 31 as the rotor 31 cools, decreasing the axial thickness between the inboard friction surface 32 and the outboard friction surface 33. Also, if the vehicle operator does not fully actuate the associated brake pedal or hand lever, the parking and emergency brake mechanism 40 of this invention is operative to move the brake shoes 41 and 42 into frictional engagement with the rotor 31 should the vehicle, and therefore the rotor 31, tend to move from its parked position.

While the parking and emergency brake mechanism 40 of this invention has been illustrated and described in connection with a "sliding" caliper type of disc brake assembly 10, the invention may be used with other types of brake assemblies. For example, the invention may be used in connection with a "fixed" caliper type of disc brake assembly (not shown).

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A disc brake assembly comprising:

an anchor plate adapted to be connected to a non-rotatable component of a vehicle;

a caliper connected to said anchor plate;

a brake rotor adapted to be connected to a rotatable component of the vehicle for rotation therewith;

a first pair of brake shoes disposed on opposite sides of said brake rotor;

a service brake mechanism carried by said caliper and adapted to be actuated to selectively move said first pair of brake shoes from a non-braking position, wherein said first pair of brake shoes are disengaged from said brake rotor, to a service braking position, wherein said first pair of brake shoes frictionally engage said brake rotor;

a second pair of brake shoes disposed on opposite sides of said brake rotor, said second pair of brake shoes include an inboard brake shoe and an outboard brake shoe, said inboard brake shoe including an inboard support plate and an inboard friction pad, said outboard brake shoe including an outboard support plate and an outboard friction pad, said inboard support plate includes a generally C-shaped end having a recess formed therein, said outboard support plate includes a generally C-shaped end having a recess formed therein, and further including a block disposed in said recesses of said inboard and outboard support plates, said blocks provided with a non-threaded opening formed; and a parking and emergency brake mechanism carried by said anchor plate and adapted to be actuated to selectively move said second pair of brake shoes from a non-braking position, wherein said second pair of brake shoes are disengaged from said brake rotor, to a parking and emergency braking position, wherein said second pair of brake shoes frictionally engage said brake rotor, said parking and emergency brake mechanism exerting a predetermined force against said second pair of brake shoes urging them into frictional engagement with said brake rotor when said parking and emergency brake mechanism is applied and there is no relative rotation between said second pair of brake shoes and said brake rotor, and further including a cam mechanism which exerts an additional force against said second pair of brake shoes urging them into frictional engagement with said brake rotor when said parking and emergency brake is applied and there is relative rotation between said brake rotor and said second pair of brake shoes;

wherein said anchor plate includes an extended portion which defines a mounting member for securing said parking and emergency brake mechanism thereto, said mounting member divided into an upper mounting member portion and a lower mounting member portion, said upper mounting member portion including a pair of threaded apertures formed therethrough, said lower mounting member portion including a pair of non-threaded apertures formed therethrough, a pair of bolts including threaded upper ends and non-threaded bodies, said bolts extending through and threadably received in said threaded apertures of said upper mounting member portion, said non-threaded bodies extending through non-threaded apertures of said blocks and into said non-threaded apertures of said lower mounting member portion.

2. The disc brake assembly defined in claim 1 wherein said parking and emergency brake mechanism includes an actuating lever mechanism, said actuating lever mechanism including a pair of links, said links including first ends spaced apart from one another and coupled together by a first pivot block assembly, said links including second ends which are spaced apart from another and coupled together by a second pivot block assembly, and a cable assembly operatively connected to one of said first and second pivot block assemblies, said cable assembly adapted to be connected to a manually operable parking and emergency brake mechanism for selectively actuating said parking and emergency brake mechanism.

3. The disc brake assembly defined in claim 1 wherein said parking and emergency brake mechanism further includes a manual adjustment mechanism for adjusting the clearance between said second pair of brake shoes and said brake rotor when said parking and emergency brake mechanism is in the non-braking position.

4. The disc brake assembly defined in claim 3 wherein said manual adjustment mechanism includes a bolt and a threaded nut, said bolt extending through a pair of apertures formed through said second pair of brake shoes, said nut threadably installed on a threaded end of said bolt.

5. The disc brake assembly defined in claim 1 wherein said disc brake assembly is a sliding caliper type of disc brake assembly.

6. A disc brake assembly comprising:

an anchor plate adapted to be connected to a non-rotatable component of a vehicle, a caliper connected to said anchor plate;

a brake rotor adapted to be connected to a rotatable component of the vehicle for rotation therewith;

a first pair of brake shoes disposed on opposite sides of said brake rotor;

a service brake mechanism carried by said caliper and adapted to be actuated to selectively move said first pair of brake shoes from a non-braking position, wherein said first pair of brake shoes are disengaged from said brake rotor, to a service braking position, wherein said first pair of brake shoes frictionally engage said brake rotor;

a second pair of brake shoes disposed on opposite sides of said brake rotor, said second pair of brake shoes include an inboard brake shoe and an outboard brake shoe, said inboard brake shoe including an inboard support plate and an inboard friction pad, said outboard brake shoe including an outboard support plate and an outboard friction pad, said inboard support plate includes a generally C-shaped end having a recess formed therein, said outboard support plate includes a generally C-shaped end having a recess formed therein, and further including a block disposed in said recesses of said inboard and outboard support plates, said blocks provided with a non-threaded opening formed;

a parking and emergency brake mechanism carried by said anchor plate and adapted to be actuated to selectively move said second pair of brake shoes from a non-braking position, wherein said second pair of brake shoes are disengaged from said brake rotor, to a parking and emergency braking position, wherein said second pair of brake shoes frictionally engage said brake rotor, said parking and emergency brake mechanism exerting a predetermined force against said second pair of brake shoes urging them into frictional engagement with said brake rotor when said parking and emergency brake mechanism is applied and there is no relative rotation between said second pair of brake shoes and said brake rotor, and further including a cam mechanism which exerts an additional force against said second pair of brake shoes urging them into frictional engagement with said brake rotor when said parking and emergency brake is applied and there is relative rotation between said brake rotor and said second pair of brake shoes; and a pair of return and anti-rattle springs carried by said parking and emergency brake mechanism for retaining and moving said blocks to a normal unactuated position when said parking and emergency brake mechanism is in the non-braking position.

7. The disc brake assembly defined in claim 6 wherein said parking and emergency brake mechanism includes an actuating lever mechanism, said actuating lever mechanism including a pair of links, said links including first ends spaced apart from one another and coupled together by a first pivot block assembly, said links including second ends which are spaced apart from another and coupled together by a second pivot block assembly, and a cable assembly operatively connected to one of said first and second pivot block assemblies, said cable assembly adapted to be connected to a manually operable parking and emergency brake mechanism for selectively actuating said parking and emergency brake mechanism.

8. The disc brake assembly defined in claim 6 wherein said parking and emergency brake mechanism further includes a manual adjustment mechanism for adjusting the clearance between said second pair of brake shoes and said brake rotor when said parking and emergency brake mechanism is in the non-braking position.

9. The disc brake assembly defined in claim 6 wherein said manual adjustment mechanism includes a bolt and a threaded nut, said bolt extending through a pair of apertures formed through said second pair of brake shoes, said nut threadably installed on a threaded end of said bolt.

10. The disc brake assembly defined in claim 6 wherein said disc brake assembly is a sliding caliper type of disc brake assembly.

11. A parking and emergency brake mechanism adapted for use with a disc brake assembly for selectively engaging a brake rotor comprising:

a pair of brake shoes disposed on opposite sides of the brake rotor, said pair of brake shoes include an inboard brake shoe and an outboard brake shoe, said inboard brake shoe including an inboard support plate and an inboard friction pad, said outboard brake shoe including an outboard support plate and an outboard friction pad, said inboard support plate includes a generally C-shaped end having a recess formed therein, said outboard support plate includes a generally C-shaped end having a recess formed therein, and further including a block disposed in said recesses of said inboard and outboard support plates, said blocks provided with a non-threaded opening formed;

a parking and emergency brake mechanism carried by the disc brake assembly and adapted to be actuated to selectively move said pair of brake shoes from a non-braking position, wherein said pair of brake shoes are disengaged from the brake rotor, to a parking and emergency braking position, wherein said pair of brake shoes frictionally engage the brake rotor, wherein said parking and emergency brake mechanism exerts a predetermined force against said pair of brake shoes urging them into frictional engagement with the brake rotor when said parking and emergency brake mechanism is applied and there is no relative rotation between said pair of brake shoes and the brake rotor, and further including a cam mechanism which exerts an additional force against said pair of brake shoes urging them into frictional engagement with the brake rotor when said parking and emergency brake is applied and there is relative rotation between the brake rotor and said pair of brake shoes; and a pair of return and anti-rattle springs carried by said parking and emergency brake mechanism for retaining and moving said blocks to a normal unactuated position when said parking and emergency brake mechanism is in the non-braking position.

12. The parking and emergency brake mechanism defined in claim 11 wherein said parking and emergency brake mechanism includes an actuating lever mechanism, said actuating lever mechanism including a pair of links, said links including first ends spaced apart from one another and coupled together by a first pivot block assembly, said links including second ends which are spaced apart from another and coupled together by a second pivot block assembly, and a cable assembly operatively connected to one of said first and second pivot block assemblies, said cable assembly adapted to be connected to a manually operable parking and emergency brake mechanism for selectively actuating said parking and emergency brake mechanism.

13. The parking and emergency brake mechanism defined in claim 11 wherein said parking and emergency brake mechanism further includes a manual adjustment mechanism for adjusting the clearance between the said pair of brake shoes and the brake rotor when said parking and emergency brake mechanism is in the non-braking position.

14. The parking and emergency brake mechanism defined in claim 13 wherein said manual adjustment mechanism includes a bolt and a threaded nut, said bolt extending through a pair of apertures formed through said pair of brake shoes, said nut threadably installed on a threaded end of said bolt.

* * * * *